United States Patent [19]  [11] 3,870,684
Witt et al.  [45] Mar. 11, 1975

[54] PREPARATION OF CROSS-LINKED PARTICLES OF POLYURETHANE OR POLYUREA CONTAINING IONIC GROUPS

[75] Inventors: Harro Witt, Cologne-Buchheim; Dieter Dieterich, Leverkusen, both of Germany

[73] Assignee: Bayer Aktiengesellschaft, Leverkusen, Germany

[22] Filed: June 29, 1972

[21] Appl. No.: 267,349

Related U.S. Application Data

[63] Continuation of Ser. No. 43,651, April 29, 1970, abandoned, which is a continuation of Ser. No. 634,086, April 27, 1967, abandoned.

[52] U.S. Cl. ............... 260/75 NH, 260/29.2 TN, 260/75 NE, 260/77.5 CH, 260/77.5 AA, 260/77.5 Q
[51] Int. Cl... C08g 22/16, C08g 22/30, C08g 51/24
[58] Field of Search ... 260/29.2 TN, 75 NH, 77.5 Q

[56] References Cited
UNITED STATES PATENTS

| 2,968,575 | 1/1961 | Mallonee | 260/29.2 TN |
| 3,264,134 | 8/1966 | Vill et al. | 260/29.2 TN |
| 3,410,817 | 11/1968 | McClellan et al. | 260/29.2 TN |
| 3,479,310 | 11/1969 | Dieterich et al. | 260/29.2 TN |

FOREIGN PATENTS OR APPLICATIONS

| 673,432 | 4/1966 | Belgium | 260/29.2 TN |
| 1,076,688 | 7/1967 | Great Britain | 260/29.2 TN |

*Primary Examiner*—Murray Tillman
*Assistant Examiner*—Arthur H. Koeckert
*Attorney, Agent, or Firm*—Gene Harsh

[57] ABSTRACT

Aqueous dispersions are prepared by dispersing in an aqueous polyamine solution an NCO terminated polyurethane or polyurea containing ionic groups.

8 Claims, No Drawings

PREPARATION OF CROSS-LINKED PARTICLES OF POLYURETHANE OR POLYUREA CONTAINING IONIC GROUPS

This is a continuation of application Ser. No. 043,651, filed Apr. 29, 1970, now abandoned itself a continuation of Ser. No. 634,086, filed Apr. 27, 1967, now abandoned.

This invention relates to aqueous dispersions of polyurethane or polyurea polymers and more particularly to dispersions of cross-linked polyaddition products containing urea groups.

It is already known that polyurethanes containing ionic groups in the molecule can be converted into aqueous dispersons. According to Belgian Patent Specification No. 653,223 ionic polyurethanes can be prepared from organic polyisocyanates and compounds containing at least two reactive hydrogen atoms in the molecule using compounds which contain at least one salt-type group or group capable of salt formation in addition to at least one NCO group or at least one reactive hydrogen atom. According to a preferred embodiment of this process, a dispersion is prepared from a solution in a suitable organic solvent of a polyurethane prepared in this way in which this solvent is replaced by water.

There are three possible results when polyurethane is prepared in this way, depending upon the proportion of isocyanate groups to reactive hydrogen atoms:

1. NCO groups in below equivalent amount
2. Equivalence
3. NCO groups in excess

In cases 1 and 2, no further chemical reactions take place on conversion of the polyurethane into an aqueous dispersion. Only in case 2 is maximum chain length possible, but since higher molecular weight polyurethanes must be predominantly linear if they are to be sufficiently soluble in organic solvents, this maximum chain length can only be achieved if cross-linking reactions are substantially eliminated. The latex particles of 1 and 2 are, for example, soluble in dimethylformamide.

In case 3 the situation is different. The excess NCO groups react with water to give rise to chain lengthening and branching of the molecules, and the latex particles may be largely insoluble in dimethylformamide. This process has several serious disadvantages and lumps are usually formed in the reaction mixtures. The main disadvantage is that the primary latex formed undergoes pronounced changes over a period of time. Thus a latex which is originally highly fluid and finely subdivided may become completely lumpy or curdled after a few hours, in some cases only after days. Another disadvantage is that relatively large quantities of water are required to produce any latex at all. Moreover the results are reproducible only with difficulty.

It would therefore be expected that aqueous dispersions of highly cross-linked discrete particles obtained from ionic polyurethanes or polyureas having free NCO groups in a single reaction stage by a process which could be commercially utilized would be difficult to prepare. This is because on the one hand the prepolymers would have to be soluble in organic solvents and therefore substantially linear in structure, and on the other hand the reaction of excess isocyanate groups with water would in any case itself give rise to the substantial difficulties.

It is therefore an object of this invention to provide improved polyurethane or polyurea dispersions in water. It is another object to provide dispersions of cross-linked polyaddition products containing urea groups. It is still another object to provide an improved latex suitable for the preparation of waterproof coatings. It is a further object to provide an improved method of dispersing polyurethane polyaddition products in water.

The foregoing objects and others which will become apparent from the following description are accomplished in accordance with the invention generally speaking of providing aqueous dispersions of cross-linked polyaddition products containing urea groups by dispersing polyurethane or polyurea polymers containing free NCO groups and from about 0.001 to about 0.2 equivalent percent of salt-type groups, in a water solution containing polyamines. While the dispersion in accordance with this invention can be prepared from both polyurethanes, polyureas or polymers containing both groups, for simplicity throughout this specification these polymers will be referred to generally as polyurethanes.

Thus, this invention provides for the preparation of water dispersions of polyurethanes wherein compounds with acid groups which can be neutralized by base are incorporated into the polyurethane components in either monofunctional or polyfunctional form and then the acid groups are converted to the salt to produce a dispersible composition. Another way is the incorporation of compounds with basic groups which can be neutralized by acids or alkylated with quaternizing agents in order to form salt-type groups. However, in order to avoid the complete solution of the polyurethane and simultaneously avoid the preparation of a solution of the polyurethane, a critical amount of the salt-type groups is present in the polymer between about 0.001 and 0.2 equivalent percent. It is not necessary to incorporate the salt forming components into the polyurethane in bifunctional form as is customary in the process of building up polyurethane prepolymers. It is satisfactory to incorporate monofunctional compounds such as halogen alcohols, tertiary aminoalcohols or amino acids. The salt-type group is chemically bonded into the polyurethane. The term equivalent percent is intended to indicate the equivalents per 100 grams of polyurethane mass.

Any suitable process of preparing the polyurethane dispersions may be used including, for example, the preparation ob both anionic and cationic dispersions. The resulting polyurethane materials obtainable from these dispersions are free from emulsifiers and are predominantly hydrophobic in character and free from hydrophilic low molecular weight impurities. The polyurethanes are preferably predominantly linear and are produced from polyhydroxyl compounds which have a molecular weight preferably of from about 300 to about 10,000, organic polyisocyanates and, if desired, chain lengthening agents. In the production of the polyurethane dispersions, a component having at least one salt-type group is included. This may be a compound with active hydrogen atoms as determined by the Zerewitinoff method and thus capable of reacting with an isocyanato group or it can be an isocyanate. It is also possible to use some of each so long as the final product for dispersion or the final product in the dispersion has from about 0.001 to 0.2 equivalent percent of the salt-type groups. If the organic compound has at least two active hydrogen containing groups and contains the salt-type group or group capable of salt formation, or if the isocyanate contains a plurality of isocyanate groups, these compounds may be the sole compounds used to prepare the polyurethane polymer. The chain lengthening agents may have the salt-type group. After the prepolymer is formed, which has the group capable of forming a salt, the reaction mixture is converted into an aqueous dispersion by reaction of the groups capable of forming salts with a base or alternately with an acid or quaternizing agent depending on the groups used and dispersed in water. It is sometimes desirable to prepare the initial polymer in an inert organic solvent and subsequently convert the polymer into an aqueous dispersion for example, by means of a simple low speed stirrer.

Any suitable organic compound containing active hydrogen containing groups as determined by the Zerewitinoff method may be used. It is preferred to use organic polyhydroxyl compounds which are predominantly linear and have a molecular weight of from about 300 to about 10,000, preferably from about 500 to about 4,000. The most suitable polyhydroxyl compounds include polyalkylene ether glycols, dihydroxy polyesters, including dihydroxy polyesteramides, dihydroxy polyacetals and dihydroxy polythioethers.

Any suitable polyalkylene ether glycol may be used including those prepared from tetrahydrofuran, propylene oxide, co-polymerization products or graft polymerization products of these compounds such as the products of the addition of the aforementioned polyalkylene oxides and polystyrene and the like. It is also possible to use mixed polyethers obtained, for example, by the condensation of 1,6-hexane diol, 3-methyl-1,6-hexane diol, 1,7-heptane diol, 1,8-octane diol or the like with or without the addition of 10 to 30 percent of lower glycols such as, for example, ethylene glycol, 1,2-propane diol and the like. In addition, one may use propoxylated and ethoxylated or mixed propoxylated and ethoxylated glycols such as, propoxylated butane diol or ethoxylated amines such as propoxylated N,N'-dimethyl diethylene diamine and the like.

Any suitable polyhydric polythioether may be used, such as, for example, the condensation product of thiodiglycol with itself or with other glycols such as ethylene glycol, 1,2-propylene glycol and the like as well as those which contain tertiary nitrogen atoms, for example, N,N-dihydroxy-p-ethyl-aniline and the like.

Any suitable polyacetal may be used, but is is preferred to use the water insoluble types, for example, those from 1,6-hexane diol and formaldehyde, from 4,-4'-dihydroxyethoxy-diphenyldimethyl-methane and formaldehyde and the like.

Any suitable polyester may be used such as, for example, those obtained from polyhydric alcohols and polycarboxylic acids to which diamines and amino alcohols may be added to prepare polyesteramides. Any suitable polyhydric alcohol, but preferably a dihydroxy alcohol such as, for example, diethylene glycol, 1,2-propane diol, 1,4-butane diol, 1,6-hexane diol and the like together with minor amounts of trimethylolpropane, glycerine or the like may be used. Any suitable polycarboxylic acid may be used such as, for example, adipic acid, phthalic acid, terephthalic acid, sebacic acid, suberic acid, azelaic acid or the like together with minor amounts of tricarboxylic acids such as, for example, 1,3,5-benzene tricarboxylic acid and the like. Any suitable diamine such as ethylene diamine or amino alcohol such as ethanol amine may be used.

It is also possible to use polyhydroxyl compounds which contain urethane or urea groups as well as mixtures of the various polyhydroxy compounds including hydrophilic polyethers, such as polyethylene glycol, polyesters and polyacetals. It is preferred to use predominantly hydrophobic polyhydroxyl compounds and hydrophilic polyhydroxyl compounds should only be used in certain proportions which will not harm the final product. In general, less than about 25 percent of the polyhydroxyl compound should be of the hydrophilic type. It is also possible to use natural polyols such as castor oil, hydroxylated tall oil, carbohydrates and the like.

The salt type or salt forming group may be in the organic polyisocyanate or polyhydroxyl compound and components suitable for the preparation of salt containing polyisocyanates and polyhydroxyl compounds are disclosed below.

Any suitable organic polyisocyanate may be used, but it is preferred to use organic diisocyanates and especially aliphatic and aromatic diisocyanates such as, for example, 1,5-naphthylene diisocyanate, 4,4'-diphenylmethane diisocyanate, 4,4'-diphenyl-dimethylmethane-diisocyanate, di- and tetralkyl-diphenylmethane diisocyanate, 4,4'-dibenzyl diisocyanate, 1,3-phenylene diisocyanate, 1,4-phenylene diisocyanate, toluylene diisocyanate, chlorinated and brominated isocyanates, isocyanates containing phosphorous, butane-1,4-diisocyanate, hexane-1,6-diisocyanate, dicyclohexylmethane diisocyanate, and cyclohexane-1,4-diisocyanate. Isocyanates which deserve to be specially mentioned are partially masked isocyanates which enable the formation of self-cross linking polyurethanes, e.g. dimeric toluylene diisocyanate as well as polyisocyanates which have been partially or completely reacted e.g. with phenol, tertiary butanol, phthalimide or caprolactam and which, when they are completely masked, at first do not take part in the reaction but are simply mixed into the reaction mixture.

Chain lengthening agents with reactive hydrogen atoms which could also be used would be, for example, the usual glycols such as ethylene glycol, di-, tri- and tetraethylene glycol, 1,4-butane diol, propane diol-1,2, propanediol-1,3, neopentylglycol, dihydroxyethoxyhydroquinone, dihydroxyethyldiane, and also diamines, e.g. ethylene diamine, hexamethylenediamine, hydrazine, ammonia, benzidine, diaminodiphenylmethane, aminoalcohols such as ethanol amine and water.

As compounds which contain at least one hydrogen atom reactive with isocyanate groups or at least one isocyanate group and at least one group capable of salt formation there may be used alone or in admixture the following compounds:

1. Compounds which have basic tertiary amino groups which can be neutralized or quaternized with aqueous acids:

a. Alcohols especially alkoxylated aliphatic, cycloaliphatic, aromatic and heterocyclic, secondary amines e.g. N,N-dimethylethanolamine, N,N-diethylethanolamine, N,N-dibutylethanolamine, 1-dimethylamino-propanol-2. N,N-methyl-beta-hydroxyethyl-aniline, N,N-methyl-beta-hydroxypropyl-aniline, N,N-ethyl-beta-hydroxyethyl-aniline, N,N-butyl-beta-hydroxyethylaniline, N-oxoethylpiperidine, N-oxoethylmorpholine, alpha-hydroxyethylpyridine and alpha-hydroxy-ethyl-quinoline.

b. Diols and triols especially alkoxylated aliphatic, cycloaliphatic, aromatic and heterocyclic primary amines, e.g. N-methyl-diethanolamine, N-butyldiethanolamine, N-oleyl-diethanolamine, N-cyclohexyl-diethanolamine, N-methyl-diisopropanolamine, N-cyclohexyl-diisopropanolamine, N,N-dioxaethylaniline, N,N-dioxaethyl-m-toluidine, N,N-dioxaethyl-p-toluidine, N,N-dioxypropyl-naphthylamine, N,N-tetraoxaethyl-alpha-amino-pyridine, dioxaethylpiperazine, polyethoxylated butyldiethanolamine, polypropoxylated methyldiethanolamine (molecular weight 1,000), polypropoxylated methyldiethanolamine (molecular weight 2,000), polyesters with tertiary amino groups, tri-[2-hydroxypropyl-(1)]-amine, N,N-di-n-(2,3-dihydroxypropyl)-aniline, N,N'-dimethyl-N,N'-bis-oxaethylhydrazine and N,N'-dimethyl-N,N'-bis-oxypropyl-ethylenediamine.

c. Aminoalcohols e.g. addition products obtained by hydrogenation, of alkylene oxide and acrylonitrile to primary amines, e.g. N-methyl-N-(3-aminopropyl)-ethanolamine, N-cyclohexyl-N-(3-aminopropyl)-propanol-2-amine, N,-N-bis-(3-aminopropyl)-ethanolamine, and N-3-aminopropyldiethanolamine.

d. Amines e.g. N,N-dimethylhydrazine, N,N-dimethyl-ethylenediamine, 1-di-ethylamino-4-amino-pentane, alpha-aminopyridine, 3-amino-N-ethylcarbazole, N,N-dimethyl-propylene-diamine, N-aminopropyl-piperidine, N-aminopropyl-morpholine, N-aminopropyl-ethyleneimine and 1,3-bispiperidine-2-amine-propane.

e. Diamines, triamines, amides especially compounds obtained by hydrogenation of addition products of acrylonitrile to primary and disecondary amines e.g. bis-(3-aminopropyl)-methylamine, bis-(3-aminopropyl)-cyclohexylamine, bis-(3-aminopropyl)-aniline, bis-(3-aminopropyl)-toluidine, diaminocarbazole, bis-(aminopropoxyethyl)-butylamine, tri-(aminopropyl)-amine, N,N-bis-carbonamidopropyl-hexamethylene-diamine, and products obtained by the addition of acrylamide to diamines and diols.

2. Compounds which contain halogen atoms capable of quaternating reactions or suitable esters of strong acids:

2-chloroethanol, 2-bromoethanol, 4-chlorobutanol, 3-bromopropanol, beta-chloroethylamine, 6-chlorohexylamine, ethanolaminesulphuric acid ester, N,N-bis-hydroxy-ethyl-N'-m-chloromethylphenylurea, N-hydroxy-N'-chlorohexyl urea, glycerolamino-chloroethyl-urethane, chloro-acetyl-ethylenediamine bromo-acetyl-dipropylenetriamine, trichloroacetyl-triethylenetetramine, glycerol-alpha-bromohydrin, polypropoxylated glycerol-alpha-chlorohydrin, polyester with aliphatically bound halogen and 1,3-dichloropropanol-2.

The following are examples of suitable isocyanates: chlorohexylisocyanate, m-chloromethylphenyl-isocyanate, p-chlorophenyl-isocyanate, bis-chloromethyl-diphenylmethane diisocyanate, 2,4-diisocyanate-benzyl chloride, 2,6-diisocyanate benzyl chloride and N-(4-methyl-3-isocyanate-phenyl)-beta-bromoethyl-urethane.

3. Compounds which contain carboxylic acid groups capable of salt formation:

a. Hydroxy and mercapto carboxylic acids:

Glycollic acid, thioglycollic acid, lactic acid, trichlorolactic acid, malic acid, dihydroxymaleic acid, dihydroxyfumaric acid, tartaric acid, dihydroxy-tartaric acid, mucic acid, saccharic acid, citric acid, glycerol boric acid, pentaerythritol boric acid, mannitoboric acid, salicyclic acid, 2,6-dihydroxy-benzoic acid, protocatechuic acid, beta-resorcylic acid, alpha-resorcylic acid, hydroquinone-2,5-dicarboxylic acid, 4-hydroxyisophthalic acid, 4,6-dihydroxy-isophthalic acid, oxyterephthalic acid, 5,6,7,8-tetrahydro-naphthol-2-carboxylic acid-3, 1-hydroxynaphthoic acid-2, 2,8-dihydroxynaphthoic acid-3, beta-oxypropionic acid, m-oxybenzoic acid, pyrazolone-carboxylic acid, uric acid, barbituric acid, resoles and other phenol-formaldehyde condensation products.

b. Polycarboxylic acids:

Sulphone diacetic acid, nitrilo-triacetic acid, ethylene diaminetetracetic acid, diglycollic acid, thiodiglycollic acid, methylene-di-thioglycollic acid, malonic acid, oxalic acid, succinic acid, glutaric acid, adipic acid, maleic acid, fumaric acid, gallic acid, phthalic acid, tetrachlorophthalic acid, isophthalic acid, terephthalic acid, naphthalinic tetracarboxylic acid-(1,4,5,8), o-tolylimido-diacetic acid, beta-naphthylimidodiacetic acid, pyridine-dicarboxylic acid and dithiodipropionic acid.

c. Aminocarboxylic acids:

Oxaluric acid, anilido acetic acid, 2-hydroxy-carbazolecarboxylic acid-3, glycine, sarcosine, methionine, alpha-alanine, beta-alanine, 6-aminocaproic acid, 6benzoyl-amino-2-chlorocaproic acid, 4-aminobutyric acid, aspartic acid, glutamic acid, histidine, anthranilic acid, 2-ethylamino-benzoic acid, N-(2-carboxy-phenyl)-aminoacetic acid, 2-(3'-amino-benzenesulphonyl-amino)-benzoic acid, 3-aminobenzoic acid, 4-aminobenzoic acid, N-phenylaminoacetic acid, 3,4-diaminobenzoic acid, 5-aminobenzene-dicarboxylic acid and 5-(4'-aminobenzoyl-amino)-2-aminobenzoic acid, lysine.

d. Hydroxy- and carboxy-sulphonic acids:

2-hydroxyethanesulphonic acid, phenolsulphonic acid-2, phenolsulphonic acid-3, phenolsulphonic acid-4, phenol-disulphonic acid-2,4, sulphoacetic acid, m-sulphobenzoic acid, p-sulphobenzoic acid, benzoic acid-1-disulphonic acid-3,5, 2-chlorobenzoic acid-1-sulphonic acid-4, 2-hydroxybenzoic acid-1-sulphonic acid-5, naphthol-1-sulphonic acid, naphthol-1-disulphonic acid, 8-chloronaphthol-1-disulphonic acid, naphthol-1-trisulphonic acid, naphthol-2-sulphonic acid-1, naphthol-2-trisulphonic acid, 1,7-dihydroxy-naphthalenesulphonic acid-3, 1,8-dihydroxynaphthalene-disulphonic acid-2,4, chromotropic acid, 2-hydroxynapthoic acid-3-sulphonic acid-6, and 2-hydroxycarbazole-sulphonic acid-7.

e. Aminosulphonic acids:

Amidosulphonic acids, hydroxylamine-monosulphonic acid, hydrazine-disulphonic acid, sulphanilic acid, N-phenyl-aminomethanesulphonic acid, 4,6-dichloroaniline-sulphonic acid-2, phenylenediamine-1,3-disulphonic acid-4,6, N-acetylnaphthylamine-1-sulphonic acid-3, naphthylamine-1-sulphonic acid, naphthylamine-2-sulphonic acid, naphthylamine-disulphonic acid, naphthylamine-trisulphonic acid, 4,4'-di-(p-amino benzoyl-amino)-diphenyl urea-disulphonic acid-3,3', phenylhydrazine-disulphonic acid-2,5, 2,3-dimethyl-4-aminoazobenzene-disulphonic acid-4,5, 4'-amino-stilbene-disulphonic acid-2,2'-(4-azo-4)-anisole, carbazole-disulphonic acid-2,7, taurine, methyltaurine, butyltaurine, 3-amino-benzoic acid-1-sulphonic acid-5, 3-amino-toluene-N-methane-sulphonic acid, 6-nitro-1,3-dimethylbenzene-4-sulphaminic acid, 4,6-diaminobenzene-disulphonic acid-1,3, 2,4-diamino-toluene-sulphonic acid-5, 4,4'-diamino-diphenyl-disulphonic acid-2,2', 2-aminophenolsulphonic acid-4,4,4'-diamino-diphenylether-sulphonic acid-2, 2-amino-anisole-N-methanesulphonic acid and 2-amino-diphenylamine-sulphonic acid.

Further compounds are the addition products of unsaturated acids such as, for example, acrylic acid, methacrylic acid, vinylsulphonic acid, styrene, sulphonic acid and the like with unsaturated nitriles such as, for example, acrylonitrile and the like; the addition products of an acid and an amine, including acids which may be saponified such as, for example, the above-mentioned acids; cyclic dicarboxylic anhydrides such as, for example, maleic anhydride, phthalic anhydride, succinic anhydride and the like; sulphocarboxylic acid anhydrides such as sulphoacetic acid anhydride, o-sulphobenzoic acid anhydride and the like; lactones such as, for example, b-propiolactone and the like; reaction products of olefines with sulphur trioxide such as, for example, carbyl sulphate and the like; epoxycarboxylic and epoxysulfonic acids such as, for example, glycidic acid, 2,3-epoxypropane sulphonic acid and the like; sultones such as, for example, 1,3-propanesultone, 1,4-butanesultone, 1,8-naphthasultone and the like; cyclic sulphates such as, for example, glycol sulphate and the like; disulphonic acid anhydrides such as, for example, benzene disulphonic acid-(1,2)-anhydride and the like. Some suitable amines for the preparation of the addition product are aliphatic and aromatic amines such as methylamine, ethylamine, propylamine, butylamine, oleylamine, stearylamine, aniline, toluidine, 1,2-ethylenediamine, 1,6-hexamethylenediamine, all of the isomeric phenylene diamines, hydrazine and alkylated hydrazines such as, for example, butyl hydrazine, ammonia, amino alcohols such as hydroxylalkylated amines and hydrazines including, for example, ethanolamine hydroxypentylhydrazine and the like; the addition products of sodium hydrogen sulphite and olefinically unsaturated alcohols and amines, such as, for example, allyl alcohol and allylamine.

Inorganic and organic acids and compounds having reactive halogen atoms and corresponding esters of strong acids may be used as the salt-forming substances for Group 1.

The following are a few examples:

Hydrochloric acid, nitric acid, hypophosphoric acid, phosphoric acid, amido-sulphonic acid, hydroxylamine-monosulphonic acid, fumaric acid, acetic acid, glycollic acid, lactic acid, chloroacetic acid, bromacetic acetate, sorbitol-boric acid, methyl chloride, butyl bromide, dimethylsulphate, diethylsulphate, benzyl chloride, p-toluene-sulphonic acid methyl ester, methyl bromide, ethylene chlorohydrin, ethylene bromohydrin, glycerolalpha-bromohydrin, chloroacetic ester, chloroacetamide, bromoacetamide, dibromoethane, chlorobromobutane, dibromobutane, ethylene oxide, propylene oxide and 2,3-epoxypropanol.

The compounds of Group 2 may be quaternated or ternated with tertiary amines and also with sulphides or phosphines. Quaternary ammonium- and phosphonium- or ternary sulphonium salts are then formed.

The following are examples: Trimethylamine, triethylamine, tributylamine, pyridine, triethanolamine, the compounds given under Groups 1a and 1b, dimethylsulphide, diethylsulphide, thiodiglycol, thiodiglycollic acid, trialkylphosphines, alkylarylphosphines and triarylphosphines.

Suitable salt-forming agents for the compounds of Group 3 are inorganic and organic bases, e.g., sodium hydroxide, potassium hydroxide, potassium carbonate, sodium hydrogen carbonate, ammmonia, primary, secondary and tertiary amines. Finally, inorganic phosphorous compounds may also be used as compounds capable of salt formation, and these include both basic phosphines which are capable of being incorporated in the molecule, such as diethyl-beta-hydroxyethylphosphine, methyl-bis-beta-hydroxyethylphosphine, tri-beta-hydroxymethylphosphine, and derivatives such as phosphinic acids, phosphonous acids, phosphonic acids, and esters of the phosphorous, phosphoric acids, and their thioanalogues, e.g. bis-(alpha-hydroxy-isopropyl)-phosphonic acid, hydroxy-alkane-phosphoric acid, phosphoric acid-bis-glycollic ester.

The salt-forming components can be added in the course of the production of the polyurethane at any suitable time either with or without the presence of solvents, and the salt formation taking place either during the formation of the basic polyurethane polymer or at the time of the dispersion. Where the salt-forming components are polyfunctional they may either partly or entirely replace the other polyhydroxyl compounds set forth above or the polyisocyanate or the chain lengthening agents provided that the critical amount of salt type component is present in the compound. The preadduct is generally formed first from the high molecular weight polyhydroxyl compound either as a melt or as a solution by reaction of the polyhydroxyl compound with an organic polyisocyanate. This preadduct is then reacted with a chain lengthening agent in solution, if desired. In principle, this method could also be used in cases where the salt component or the component capable of salt formation is only monofunctional and therefore does not react like a chain lengthening agent. Where all monofunctional salt forming components are used it is frequently advantageous to add a trifunctional component or higher functional component including -trimethylolpropane, a diamine such as ethylene diamine, an organic polyisocyanate, such as triphenylmethane triisocyanate, or even water in order to compensate for the interruption of the chains by the monofunctional component.

On the other hand, it may be advisable to incorporate the salt-forming component into the preadduct. This is especially true for salt-forming components which are in themselves monofunctional such as salts of hydroxy- or amino- carboxylic acids or sulphonic acids and especially where the polyhydroxy compound contains the salt-forming components.

It is possible to add the component capable of forming a salt together with a component which produces the salt, thus producing the salt in situ.

After the formation of the preadduct, an organic solvent is preferably added and the reaction is preferably continued at a relatively low temperature of about 20° to about 100°C, especially where very reactive chain lengthening agents are used. Thus, the polyurethane preadduct remains of a low viscosity so that it can be easily stirred into the aqueous phase. It is preferred that the solvents be of essentially nonflammable character and at most they contain no more than 20 percent by weight of the polyurethane of a solvent which is hydrophobic or inflammable. The choice of solvents is important for the production of the aqueous latex dispersion in a later stage. It is preferable for the polyurethane latex to be completely free from solvent, so that the solvent added in the course of the process in order to make the preadduct easier to work up should be one which is easily removed from the water containing phase by distillation. Therefore, the preferred solvents are benzene, ethyl acetate, acetone, methyl ethyl ketone and the like. Other solvents may be used, but should not have a boilng point above that of water and should be inert to isocyanates provided that the solvent is to be added during the course of the reaction while free isocyanate groups are present. If it is desired to dilute the reaction mass after the reaction is completed, lower alcohols such as methanol can be used.

It is not always necessary to use a solvent and the whole reaction can be carried out in the melt without any solvent to obtain a rubbery mass which is subsequently dissolved in a polar or nonpolar and/or water containing solvent. The solubility of the polyurethane in an aqueous organic medium or the solubility of the water in the polyurethane which contains solvent depends mainly on whether the mass contains too many or too few salt type groups in accordance with the invention.

If the polyurethane mass is not formed as a salt, the high molecular weight polyurethane formed is subsequently, if desired in solution converted into a salt by adding the quaternating or neutralizing agent, if necessary leaving it to react for some time at elevated temperature. Although the neutralization generally takes place sufficiently rapidly even at room temperature, it is sometimes desirable to heat for about 10 to about 180 minutes at about 50° to about 120°C. for carrying out the quaternating reaction. The quantity of quaternating or neutralization agent depends on the quantity of salt forming groups present in the polyurethane mass. An excess may be useful only in the case of volatile compounds which are easily removed (acetic acid, methyl chloride, ammonia). It is frequently useful to have slightly less than an equivalent quantity of quaternating or neutralizing agent, in order to ensure a favorable pH of the reaction medium. However, it is also possible to convert only a fraction of the groups capable of salt formation in the polyurethane mass into the form of a salt.

The proportion of salt type groups must be 0.02 to 1 percent but in the case of quaternary nitrogen atoms not more than 0.2 percent of the polyurethane mass, where "salt type group" are understood to mean, for example, the following groups:

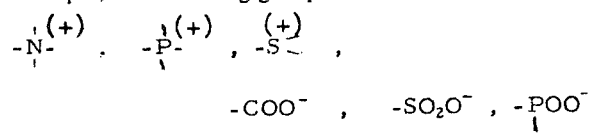

According to a preferred embodiment of the process of the invention, the solution of the ionic polyisocyanate addition product containing NCO groups in a suitable organic solvent such as acetone, ethyl acetate, methyl ethyl ketone, tetrahydrofuran, benzene or methylene dichloride or mixtures thereof is added to the solution of the polyamine or hydrazine in water, with stirring, and the organic solvent is removed by distillation to form a dispersion of highly cross-linked particles. In cases where it is not necessary to free the dispersions from organic solvents, one may also use higher boiling solvents such as cyclohexanone, chlorobenzene, dimethylformamide or dimethylsulphoxide.

It is well known that amines react with isocyanates much more quickly than water. It was therefore exceedingly surprising that the production of the dispersion proceeded without formation of lumps when highly reactive amines are used, that even less water was required than is normal for dispersion and that the process of dispersion was perfectly reproducible. This is particularly surprising when amines having more than two primary and/or secondary amino groups are used, which is even preferred in the process according to the invention. It is particularly advantageous that dispersions prepared by this method acquire their final characteristics as soon as they have been made, and thereafter undergo practically no change in the course of time. Another advantage is that high speed stirrers are not required and ordinary stirrers rotating at low speeds are quite adequate. It is possible by this method to produce aqueous dispersions which will not dissolve even in hot dimethylformamide.

The properties of the dispersions produced can be accurately controlled within wide limits.

The properties of the dispersion can be influenced through the structure of the ionic prepolymer which contains isocyanate groups. This can be controlled by known methods with the use of the starting materials listed above. Other compounds which may be used as higher molecular weight compounds containing reactive hydrogen atoms are compounds containing amino groups, as described in French Patent Specification Nos. 1,361,810 and 1,300,981, German Auslegeschrfit No. 1,122,254, and U.S. Pat. No. 2,888,439.

The size of the particles is decisively influenced by the quantity of ionic groups contained in the prepolymer while their hardness depends mainly on the nature of the polyisocyanates and of the compounds which contain reactive hydrogen atoms. If these are exclusively compounds of low molecular weights of up to about 500, relatively hard products are obtained. If higher molecular weight compounds having molecular weights of up to about 10,000 are used exclusively soft products are obtained. All mixtures between these extremes are possible. Since relatively large excesses of isocyanate are employed (the molar ratio of NCO groups to reactive hydrogen atoms is suitably between 4:1 and 1.1:1 preferably 3:1 to 1.4:1 in the formation of the prepolymer which may be carried out in solvents, so that the molecular weights do not increase greatly, the chain structure need not be strictly linear. Commercial solvents which still contain water may be used.

The ionic polyisocyanate adducts containing NCO groups (polyurethanes and/or polyureas) are converted into an aqueous dispersion and according to the invention, the process of dispersion is carried out in the presence of polyamines. The polyamines are suitably dissolved or dispersed in the water required for dispersion. In exceptional cases the polyamine may also be dispersed in an organic solvent and added during the process of dispersion. In this case one may use concentrated solutions of the polyamine in a solvent in which it is readily soluble. Apart from using solvents which are also suitable for the preparation of the isocyanate prepolymer, low boiling alcohols such as methanol or ethanol may also be used.

The polyurethane mass converted into the form of a salt now has unlimited compatibility with water and can be converted into an aqueous dispersion by mixing into a water containing polyamine solution. A preferred method consists in diluting the polyurethane mass, which carries salt-type groups and is dissolved in a polar solvent, with about 70 to about 150 percent of its weight of water, containing polyamine and then largely or completely distilling off the organic solvent under reduced pressure.

It is possible to use other methods for taking the polyurethane mass into the aqueous phase e.g. the organic polyurethane solution may be run into the given quantity of water while stirring vigorously, and the organic solvent may be removed at the same time or afterwards. Nonpolar solvents may be used in both methods, an emulsion being formed in the presence of water.

It is also possible to inject the still liquid polyurethane mass free from solvent into water, e.g. by means of nozzles, with or without the use of compressed air, particles of the size of dispersion particles being then formed immediately. Ultrasonic waves may also be used for forming the dispersion.

However, it must be emphasized that such energy consuming arrangements are not necessary and that the dispersion may be produced in a simple manner as described above.

Water soluble aliphatic polyamines containing a total of at least three primary and/or secondary amino groups of which groups at least two are primary amino are preferably used. The following compounds are especially suitable for the process according to the invention: diethylenetriamine, triethylenetetramine, tetraethylenepentamine, pentaethylenehexamine, tripropylene-1,2-tetramine and bis-(3-amino-propyl)-amine.

The quantity of polyamine used depends on the NCO content of the prepolymer (polyurethane and/or polyurea). The ratio of amino groups to NCO groups should be in the region of about 0.1:1 to 1.8:1, preferably 0.2:1 to 1.5:1 in order to obtain highly cross-linked particles which are insoluble in dimethylformamide. The amino compounds may be used partly in the form of their salts.

The properties of the dispersion can be decisively influenced not only by the chemical composition of the polyisocyanate prepolymer but also by the conditions under which dispersion is carried out. The most important factors are: nature and quantity of polyamines, quantity of water, nature and quantity of the organic solvent, the pH and reaction temperatures, which can be varied from about 0°C. to the boiling point of the organic solvent; the operation may, if desired, be carried out under pressure.

Another important factor is the manner in which the aqueous and organic phases are mixed, i.e. whether they are brought together substantially simultaneously, e.g. in a continuously operating mixing apparatus, or whether the organic phase is added to the aqueous phase or the aqueous phase to the organic phase. However, it must be emphasized once more that the desired end result is achieved in a simple manner e.g. by running the aqueous phase into the organic phase while stirring with an ordinary stirrer. If desired, the solvent may be removed by distillation before or during mixing.

Particle sizes of the order of $10^{-5}$ to $10^{-1}$ cm can be obtained by the process of the invention. The particles may be spherical or elongated.

The dispersions are, of course, only stable, i.e. do not sediment, if the particles do not exceed a certain size which depends on the type of polyisocyanate adduct. In this case, the particles must be smaller than 3 microns. Coarser particles form unstable dispersions which settle out although the sediment can easily be redispersed.

Depending on their properties, such dispersions, are used if desired in combination with cross-linked additives for various purposes, e.g. textile and leather dressings, coatings, finishes for strengthening fleeces, and backings. It is possible to utilise the dispersion directly after manufacture with the removal of the organic solvent still contained in the aqueous dispersion. It is of course also possible to utilise the dispersion after any desired storage time. They may be used as binders, as additives for other dispersions, as plasticizers and as auxiliary agents in the paper industry. The coarser dispersions can be converted into powders by filtration and the finer dispersions, for example, by roller drying. These powders may in their turn be used e.g. for heat sealing adhesive.

The dispersions can in all cases be prepared without the use of emulsifiers. However, the dispersions can, of course, be stabilized aganist coagulation, caused, for example, by electrolytes, by subsequent addition of emulsifiers. Nonionic stabilizers are preferable. Protective colloids may also be used.

The invention is further illustrated by the following examples in which parts are by weight unless otherwise specified.

EXAMPLE 1

A. Preparation of starting material

About 500 parts of a polyester of hexanediol, neopentyl glycol and adipic acid (molar ratio of diols 11:6) having an OH number of 67, previously dehydrated at 15 mm Hg and 130°C, are stirred with about 107.6 parts of hexamethylene-1,6-diisocyanate for about 2 hours at temperatures between 110° and 120°C. The reaction mixture is left to cool to about 50°C. and about 4 parts of N-methyldiethanolamine dissolved in about 20 parts by volume of acetone are added at a bath temperature of about 60°C. The reaction mixture is then stirred for a further 2 hours and diluted with about 100 parts by volume of acetone. The acetone used in all the examples contains about 0.22 to about 0.25 percent water. About 3.12 parts by volume of dimethyl sulphate are then added and the reaction mixture is stirred for about 30 minutes at a bath temperature of about 60°C. The solution can be stored for several days. Before conversion into an aqueous dispersion, it is diluted with a further 680 parts by volume of acetone. One-fifth of the preadduct obtained is used in each case in the following procedures for preparing the dispersions.

B. Preparation according to the invention of the aqueous dispersion a. About 140 parts by volume of a solution in water of about 0.6 part of diethylenetriamine are run into about 248 parts of the prepolymer solution at room temperature with stirring in the course of about 1 minute. The acetone is distilled off under diminished pressure at a bath temperature of about 60°C. The resulting product consists of an aqueous dispersion of particles of about 20–30 microns which are insoluble in dimethyl formamide; these particles settle to the bottom but can easily be redispersed.

b. The procedure is the same as that given under (a) except that the aqueous amine solution is added but at a bath temperature of about 60°C. rather than at room temperature. The acetone is distilled off; it is immaterial to the properties of the dispersions whether distillation is carried out at a bath temperature of about 60°C. under diminished pressure, or at about 70°–100°C under normal pressure. A dispersion is obtained in which the particles are insoluble in dimethyl formamide and on an average 20–30 microns larger than those described above.

c. Dispersion is carried out as described under (a) and (b) except that the aqueous amine solution is added with cooling by means of an ice bath. The resulting dispersion differs from those described above only in that the particles produced are on an average 10–20 microns smaller than that obtained according to (a).

C. Blank test for comparison

The experiment is carried out as under (Ba) except that no diethylenetriamine is added to the 140 parts by volume of water. The reaction mixture completely breaks up into lumps on removal of the acetone by distillation.

EXAMPLE 2

B. The proportions used are the same as those in Example 1 under (Ba).

The method of preparing the dispersion differs only in that the aqueous phase is not added to the organic phase but the solution of the prepolymer is added to the aqueous solution of the triamine. An ordinary stirrer is employed. The resulting product is a dispersion of particles of about 5 microns which are insoluble in dimethyl formamide and which settle but can easily be redispersed.

C. Blank test for comparison

The experiment is carried out as described in Example 2(B) except that no triamine is added to the water. The reaction mixture breaks up into lumps on removal of the acetone by distillation.

EXAMPLE 3

A. Preparation of starting material

As in Example 1, a polymer is prepared from about 500 parts of a polyester of hexanediol, neopentyl glycol and adipic acid (OH number 67), about 4 parts N-methyldiethanolamine and about 114.3 parts hexamethylene-1,6-diisocyanate and this prepolymer is quaternated with about 3.12 parts by volume of dimethylsulphate and dissolved in about 700 parts by volume of acetone.

B. Preparation of dispersion in accordance with the invention

A solution of about 2.8 parts of diethylenetriamine in about 450 parts by volume of water is run into half the starting solution over a period of about 1 minute at a bath temperature of about 60°C., with stirring. After removal of the acetone, an approximately 44 percent aqueous dispersion of particles of about 10–15 microns which are insoluble in dimethylformamide is obtained, which particles unite to form larger agglomerates. The dispersion settles out but can easily be redispersed by shaking.

EXAMPLE 4

A. Preparation of starting material for Examples 4–11

As described in Example 1, a prepolymer of about 1,000 parts of a polyester of hexanediol, neopentyl glycol and adipic acid (OH number 63), about 8 parts N-methyldiethanolamine and about 208 parts hexamethylene-1,6-diisocyanate with about 6.24 parts by volume dimethylene-1,6-diisocyanate is quaternated with about 6.24 parts by volume of dimethylsulphate and dissolved in about 1,600 parts by volume of acetone. One-tenth of the quantity is used in each case in Examples 4–10.

B. Preparation of the dispersion in accordance with the invention

A solution of 1.4 parts diethylenetriamine in 240 parts by volume of water is added dropwise over a period of about 10 minutes to about 249 parts of a solution of the ionic polyurethane, which is stirred at a bath temperature of about 60°C. After removal of the acetone by distillation at reduced pressure, an approximately 36 percent aqueous dispersion of polyurethane particles of about 5–20 microns is obtained, which particles are insoluble in dimethylformamide. The particles settle but can easily be redispersed by shaking even after several months.

If the diethylenetriamine solution is adjusted to pH 7 by the addition of 1N acetic acid, a similar dispersion with particles of about 2–12 microns is obtained.

EXAMPLE 5

The procedure is the same as that used in Example 4 except that about 1.49 parts of triethylenetetramine are used instead of diethylenetriamine. An approximately 36 percent aqueous dispersion of particles insoluble in dimethylformamide results. These particles are smaller than 10 microns and they settle out but can be easily redispersed.

EXAMPLE 6

About 1.62 parts of tetraethylenepentamine are used instead of diethylenetriamine of Example 4. The resulting dispersion is similar to that of Example 5.

EXAMPLE 7

About 1.64 parts of pentaethylenehexamine are used instead of the triamine in Example 4 and a dispersion of particles of size of the order of 50 microns is obtained.

EXAMPLE 8

Instead of the triamine used in Example 4, about 1.91 parts of tripropylene-1,2-tetramine are used. The resulting dispersion substantially corresponds to those of Examples 5 and 6.

EXAMPLE 9

The diethylenetriamine used in Example 4 is replaced by about 1.78 parts of bis-(3-aminopropyl)-amine and a dispersion of fibrillar particles which are visible with the naked eye and insoluble in dimethylformamide is obtained.

EXAMPLE 10

Instead of using diethylenetriamine as in Example 4, a basic amide of equivalent weight 114 is used, which amide was prepared by known methods from adipic acid and excess diethylene triamine. If about 2.28 parts of the amide are used, a dispersion of particles of about 20–100 is obtained when about 13.7 parts of the amide are used, particles of up to 1 mm are obtained.

C. Blank test for comparison

The procedure carried out is the same as that used in Examples 4–11 except that no polyamine is added to the water. The reaction mixture in each case breaks up into lumps on removal of the acetone by distillation.

EXAMPLE 11

A. Preparation of starting material

A prepolymer produced from about 500 parts of polyester of hexanediol, neopentyl glycol and adipic acid (OH number 63), about 3 parts N-methyldiethanolamine and about 102.8 parts hexamethylene-1, 6-diisocyanate is quaternated with about 2.34 parts by volume of dimethylsulphate and dissolved in about 800 parts by volume of acetone.

B. Preparation of the dispersion in accordance with the invention

One-fifth of the prepolymer solution is stirred at a bath temperature of about 60°C. and a solution of about 1.6 parts pentaethylene-hexamine in about 250 parts by volume of water is added over a period of about 10 minutes. After removal of the acetone by distillation under reduced pressure, an aqueous dispersion of particles which are insoluble in dimethylformamide is obtained. These particles settle out but can easily be redispersed. Their particle size is in the region of 30 to 65 microns.

EXAMPLE 12

A. Preparation of starting materials a. A prepolymer is prepared in the usual manner from about 500 parts of a polyester of hexanediol, neopentyl glycol and adipic acid (OH number 63), about 2 parts N-methyldiethanolamine and about 101.2 parts hexmethylene-1,6-diisocyanate, quaternated with about 1.56 parts dimethylsulphate and then dissolved in about 800 parts by volume of acetone.

b. The starting material is obtained by quaternating a prepolymer of about 500 parts of polyester of hexanediol, neopentyl glycol and adipic acid (OH number 63), about 12 parts N-methyldiethanolamine and about 115.7 parts hexamethylene-1 6-diisocyanate with about 9.36 parts by volume of dimethylsulphate and dissolving the product in about 800 parts by volume of acetone.

B. Preparation of the dispersions in accordance with the invention

A solution of about 1.4 parts of diethylenetriamine in about 240 parts by volume of water is added in each case to one-fifth of the quantity of starting materials (a) or (b) at a bath temperature of about 60°C. over a period of about 10 minutes with stirring. The acetone is then distilled off at reduced pressure and in each case an approximately 35 percent aqueous dispersion of particles insoluble in dimethylformamide is obtained. In the case of starting material (a), the particles are 20–80 microns and settle out from the dispersion but can easily be redispersed, and in the case of starting material (b) the particles and do not settle out.

These stable dispersions dry to form soft, slightly opaque films which are stable to light.

EXAMPLE 13

A. Preparation of starting material

A prepolymer of about 500 parts of a polyester of hexanediol, neopentyl glycol and adipic ester (OH number 64), about 12 parts N-methyldiethanolamine and about 117 parts hexamethylene-1, 6-diisocyanate is quaternated with about 6.24 parts by volume of dimethylsulphate and dissolved in about 800 parts by volume of acetone.

B. Preparation of the dispersion in accordance with the invention

A solution of about 4.82 parts pentaethylenehexamine in about 240 parts by volume of water is run into one-fifth of the prepolymer solution over a period of about 2 minutes at a bath temperature of 60°C. with stirring, and the acetone is distilled off under reduced pressure. An approximately 35 percent aqueous dispersion of particles which are smaller than 1 micron and which do not settle out is formed. The dispersion contains basic nitrogen atoms and can be neutralized by acids.

EXAMPLE 14

A. Preparation of starting material

About 500 parts of a polyester of hexanediol, neopentyl glycol and adipic acid (OH number 67), about 5 parts neopentyl glycol and about 147 parts hexamethylene-1, 6-diisocyanate are stirred for about 1½ hours at about 110°–120°C. The reaction mixture is cooled to about 50°C. About 8 parts of butane-1, 4-diol and about 4 parts of N-methyldiethanolamine in about 40 parts by volume of acetone are added and the mixture is stirred for about 4 hours at a bath temperature of about 60°C. It is then diluted with about 100 parts by volume of acetone and quaternated with about 3.12 parts by volume of dimethylsulphate. Before dispersion the reaction product is diluted by addition of a further 660 parts by volume of acetone.

B. Preparation of the dispersion in accordance with the invention

A solution of about 1.03 parts of diethylenetriamine is run into one-fifth of the prepolymer solution with stirring. When the acetone has been distilled off, an aqueous dispersion of particles of about 30 microns, which are insoluble in dimethylformamide is obtained; these particles settle out but can easily be redispersed.

EXAMPLE 15

A. Prepartion of starting material

A prepolymer is prepared in the usual manner by mixing about 500 parts of a polyester of hexanediol, neopentyl glycol and adipic acid (OH number 67), about 4 parts of N-methyldiethanolamine and about 90.5 parts hexamethylene-1,6-diisocyanate and quaternating the product with about 3.12 parts by volume of dimethylsulphate. About 800 parts by volume of methyl ethyl ketone having a water content of about 0.004 percent are used in place of the acetone hitherto used as solvent.

B. Preparation of the dispersion in accordance with the invention

A solution of about 2.75 parts diethylenetriamine in about 240 parts by volume of water is run over a period of about 2 minutes into one-fifth of the prepolymer solution at a bath temperature of about 60°C., with stirring. After removal of methyl ethyl ketone by distillation, a dispersion of particles of about 50 microns, insoluble in dimethylformamide, is obtained, These particles settle out but can easily be redispersed.

EXAMPLE 16

A. Preparation of starting material

A prepolymer of about 500 parts of a polyester of hexanediol, neopentyl glycol and adipic acid (OH number 67), about 4 parts N-methyl-diethanolamine and about 67.1 parts hexamethylene-1, 6-diisocyanate is quaternated with about 3.12 parts by volume of dimethylsulphate and dissolved in about 800 parts by volume of tetrahydrofuran.

B. Preparation of the dispersion in accordance the invention

A solution of about 0.9 parts diethylenetriamine in about 240 parts by volume of water is run into one-fifth of the prepolymer solution at a bath temperature of about 60°C. with stirring, and the tetrahydrofuran is then distilled off. An aqueous dispersion of particles of about 40 microns insoluble in dimethylformamide results.

EXAMPLE 17

A. Preparation of the starting material

A prepolymer solution is prepared as described in copending application Ser. No. 512,194, filed Dec. 7, 1965. About 209 parts of a polyester of hexanediol, neopentyl glycol and adipic acid (OH number 67) are stirred together with about 38 parts hexamethylene-1,6-diisocyanate at about 120° C. for about 2 hours. The reaction mixture is left to cool to about 50°C. and then dissolved in about 700 parts by volume of acetone. About 34.1 parts of an aqueous 0.935 molar solution of the potassium salt of an adduct of 1,3-propanesultone and ethylenediamine (molar ratio 1:1) are stirred in for about 10 minutes at a bath temperature of about 60°C. (Sultone-diamine adducts are described in German Auslegeschrift No. 1,200,318.)

B. Preparation of the dispersion in accordance with the invention

A solution of about 4.88 parts diethylenetriamine in about 450 parts by volume of water is added to the entire prepolymer solution, with stirring, at a bath temperature of about 60°C. The acetone is then distilled off at reduced pressure and a dispersion of particles of less than 10 microns, insoluble in dimethylformamide, is obtained. The dispersion becomes slightly creamy.

EXAMPLE 18

The starting material is prepared in the same way as in Example 17 except that only about 11 parts of the solution of the potassium salt of the diamine-sultone adduct are used. The preparation of the dispersion is carried out in the same way as in Example 17, but using a solution of about 6.25 parts diethylenetriamine in about 450 parts by volume of water. A dispersion of particles of the order of 100 microns results. These particles are insoluble in dimethylformamide as soon as they have been formed, and settle out, but can easily be redispersed by shaking.

C. Control Test

The experiment is carried out in accordance with Example 18 except that no polyamine is added to the water. The freshly prepared dispersion is soluble in dimethylformamide. It changes over the course of time, and after a few days it has completely disintegrated into lumps.

EXAMPLE 19

A. Preparation of the starting material

About 500 parts propyleneglycol-1,2-polyether (OH number 56) are stirred for about one hour at about 90°C. with about 198 parts diphenylmethane-4,4'-diisocyanate. The reaction mixture is left to cool to about 50°C., a solution of about 10 parts N-methyldiethanolamine in about 50 parts by volume of acetone is added and the mixture is stirred for about 30 minutes at a bath temperature of about 60°C. After dilution with about 100 parts by volume of acetone, about 7.8 parts by volume of dimethylsulphate are added and the reaction mixture stirred for a further 30 minutes at a bath temperature of about 60°C. The solution is left to stand overnight and is diluted with about 650 parts by volume of acetone before further working up.

B. Preparation of the dispersion in accordance with the invention

A solution of about 1.4 parts pentaethylene hexamine in about 400 parts by volume of water is added over a period of about 2 minutes, with stirring to one-fifth of the reaction mixture at room temperature. After removal of the acetone by distillation, by approximately 27 percent aqueous dispersion of particles of 20–80 microns which are insoluble in dimethylformamide is obtained. These particles settle but can easily be redispersed.

EXAMPLE 20

The procedure is analogous to that used in Example 19, except that about 235 parts instead of about 198 parts of diphenylmethane-4,4'-diisocyanate are used for the preparation of the starting material, and a solution of about 2 parts pentaethylene hexamine in about 400 parts by volume of water is used for the preparation of the dispersion. The resulting dispersion is similar to that of Example 19.

EXAMPLE 21

A. Preparation of starting material

About 2 parts N-methyldiethanolamine dissolved in about 20 parts by volume of acetone are stirred together with about 28.2 parts hexamethylene-1,6-diisocyanate for about 30 minutes at a bath temperature of about 60°C., about 1.56 parts by volume of dimethylsulphate are added and the mixture is stirred for a further 30 minutes. A solution of about 100 parts of a diamine of average molecular weight 1400 in about 140 parts by volume of acetone is then run into the reaction mixture at about 20°C., and stirred for about 15 minutes. The diamine was obtained by reacting a polypropylene ether with nitrophenyl isocyanate followed by reduction as described in U.S. Pat. No. 2,888,439.

B. Preparation of the dispersion in accordance with the invention

A solution of about 2.4 parts pentaethylene hexamine in about 400 parts by volume of water is poured, according to the invention, into the above-mentioned solution at room temperature with stirring, and the acetone is distilled off at reduced pressure. A dispersion of polyurethane urea particles of 20–80 microns, insoluble in dimethylformamide, is obtained. These particles settle out but can be easily redispersed.

It is to be understood that the foregoing working examples are given for the purpose of illustration and that any other suitable polyisocyanate, active hydrogen containing compound, salt-forming component, solvent, polyamine, or the like could have been used in the examples provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for the preparation of sedimenting and redispersible cross-linked particles, said particles being insoluble in dimethyl formamide and containing urea groups which comprises dispersing a polyurethane or a polyurea polymer containing free NCO groups and from about 0.001 to about 0.2 equivalent per cent of an ionic group selected from the group consisting of $-\overset{|}{\underset{|}{N}}-^{(+)}$, $-\overset{|}{\underset{|}{P}}-^{(+)}$, $-\overset{|}{\underset{|}{S}}^{(+)}$, $-COO^-$, $-SO_2O^-$, and $-\overset{|}{\underset{|}{P}}OO^-$ in water in the presence of an organic aliphatic polyamine containing a total of at least three primary and/or secondary amino groups of which groups at least two are primary amino.

2. The product prepared by the process of claim 1.

3. The process of claim 1 wherein the polyurethane or polyurea contains from about 0.001 to about 0.2 equivalent per cent of quaternized nitrogen atoms.

4. The process of claim 1 wherien the polyurethane polymer containing free NCO groups is prepared by reacting in the first step an organic compound containing two active hydrogen atoms as determined by the Zerewitinoff method and having a molecular weight of from about 300 to 10,000 with an excess of an organic diisocyanate to prepare an essentially linear polyurethane having two free NCO groups and reacting the product of said first step in the second step with a chain extending agent which contains said ionic group in an amount sufficient to include from about 0.001 to about 0.2 equivalent per cent of said salt-type group into said polyurethane.

5. The process of claim 4 wherein said chain extending agent is a low molecular weight glycol containing a basic tertiary amino group which is reacted subsequent to chain extension of the isocyanato polyurethane with an inorganic acid.

6. The process of claim 1 wherein the molar ratio of the amino groups in the water solution to the isocyanato groups in the urethane or urea polymer is from about 0.1:1 to about 1.8:1.

7. The process of claim 1 wherein the polyurethane or polyurea polymer is prepared by reacting an organic polyisocyanate with an organic compound having a molecular weight of from about 300 to about 10,000 and containing active hydrogen groups as determined by the Zerewitinoff method, said reactants being present in amounts such that the NCO to active hydrogen atom ratio is from 4:1 to 1.1:1.

8. A process for the preparation of sedimenting and redispersible cross-linked particles, said particles being insoluble in dimethylformamide and containing urea groups which comprises dispersing a polyurethane or a polyurea polymer containing free NCO groups and from about 0.001 to about 0.2 equivalent percent of an ionic group selected from the group consisting of $-\overset{|}{\underset{|}{N}}-^{(+)}$, $-\overset{|}{\underset{|}{P}}-^{(+)}$, $-\overset{|}{\underset{|}{S}}^{(+)}$, $-COO^-$, $-SO_2O^-$, $-\overset{|}{\underset{|}{P}}OO^-$, in water in the presence of an organic polyamine selected from the group consisting of diethylenetriamine, triethylenetetramine, tetraethylenepentamine, pentaethylenehexamine, tripropylene-1,2-tetramine and bis-(3-amino-propyl)-amine.

* * * * *